United States Patent [19]
Volkonsky

[11] Patent Number: 5,896,307
[45] Date of Patent: Apr. 20, 1999

[54] METHOD FOR HANDLING AN UNDERFLOW CONDITION IN A PROCESSOR

[75] Inventor: Vladimir Y. Volkonsky, Moscow, Russian Federation

[73] Assignee: Sun Microsystems, Inc., Palo Alto, Calif.

[21] Appl. No.: 08/880,628

[22] Filed: Jun. 23, 1997

[51] Int. Cl.$^6$ .................................................... G06F 7/38
[52] U.S. Cl. ............................................... 364/745.03
[58] Field of Search ........................... 364/745.03, 737, 364/748.04; 395/898

[56] References Cited

U.S. PATENT DOCUMENTS

| | | | |
|---|---|---|---|
| 5,497,340 | 3/1996 | Uramoto et al. | 364/745.03 |
| 5,606,677 | 2/1997 | Balmer et al. | 364/754 |

OTHER PUBLICATIONS

"The UltraSPARC Processor—Technology White Paper; The UltraSPARC Architecture," Nov. 14, 1995, Sun Microsystems, Inc., Palo Alto, CA.

*Primary Examiner*—Tan V. Mai
*Attorney, Agent, or Firm*—D'Alessandro & Ritchie

[57] ABSTRACT

A method for handling an underflow condition in a processor is disclosed. A first plurality of signal data is packed into a first memory location so as to form a first word. A second plurality of signal data is packed into a second memory location so as to form a second word. A bitwise operation is then performed between the first word and the second word to produce a result. The result of the operation is then stored in a k bit memory location so as to form a third word. A bit mask is then obtained by arithmetic shifting the third word right (k−1) bits. The bit mask is then inverted. A logical AND operation is then performed between the inverted bit mask and the result.

42 Claims, 3 Drawing Sheets

METHOD FOR HANDLING AN UNDERFLOW CONDITION IN A PROCESSOR

BACKGROUND OF THE INVENTION

1. Field of the Invention

The present invention relates to a method for handling an underflow condition in a processor.

2. Background of the Invention

Modern computers having a superscalar architecture are able to execute several instructions concurrently. The superscalar approach, however, depends on the ability to execute multiple instructions in parallel. The instructions following a branch instruction have a procedural dependency on the branch instruction and cannot be executed until the branch is executed. This is true regardless of whether the branch is taken or not.

Known bottlenecks to issuing multiple instructions include such control dependencies. Parallel processing is extremely important in operation intensive processes, particularly in real time digital video and audio processing. For example, in a conventional system, operations on two 8-pixel vectors are typically performed one pixel at a time. However, this method requires multiple clock cycles to complete.

Graphics and video processing are operation intensive. At the same time, high-speed processing is particularly important in the areas of video processing, image compression and decompression. Furthermore, with the growth of the "multimedia" desktop, it is imperative that processors accommodate high-speed graphics, video processing, and image compression/decompression to execute multimedia applications. With the rise in demand for these electronic devices, large quantities of data must be manipulated.

Signals requiring manipulation often contain an enormous amount of information. For example, a digital NTSC signal generates approximately 10.4 million pixels per second. Since each pixel contains information for three colors, the total amount of information is more than 30 million pieces of data per second. At a CPU clock rate of 200 MHz, only 20 clock cycles are available for processing each pixel. This results in less than seven clock cycles available per color component. Moreover, in order to provide a smooth transition during real-time video processing, it is necessary to process each frame prior to its display. Therefore, processing speed is particularly important in real-time signal processing applications.

Manipulation of video and image signals is required in many applications, including video and image processing functions. When video signals are manipulated, the result may be lower than a desired lower range signal magnitude. For example, in many applications, acceptable pixel values range from 0 to 255. Therefore, an "underflow" occurs when the magnitude of a resulting video signal is less than 0.

Referring now to FIG. 1, a flow diagram illustrating a method for handling underflow in saturation mode during the processing of video signal data according to the prior art is shown. At step 10, a data byte from a first group of video image data is loaded into a first memory location. At step 12, a data byte from a second group of video image data is loaded into a second memory location. Next, at step 14, the data byte from the second group of video image data is subtracted from the data byte from the first group of video image data. At step 16, the processor causes the result of step 14 to be written into a third memory location. Next, at step 18, the result is compared with a lower range signal magnitude. If the result is less than the lower range signal magnitude, the lower range signal magnitude is transferred to the third memory location at step 20. If the difference is not less than the lower range signal magnitude, execution of the final write operation is bypassed at step 22. The step following the branch, or comparison step, has a procedural dependency on the branch and cannot be executed until the branch is executed. This is true regardless of whether the branch is taken or not. A need exists in the prior art for a method for handling an underflow condition in a processor without the use of a branch.

BRIEF DESCRIPTION OF THE INVENTION

The present invention is directed to a method for handling an underflow condition in a processor. This method is achieved without the use of a branch instruction, resulting in a substantial increase in computation speed.

A first group of signal data and a second group of signal data are selected to be processed. A bitwise operation is performed between the first group of signal data and the second group of signal data to produce a result. The result is stored in a k-bit memory location. Next, a bit mask is created by shifting the result right (k−1) bits. The bit mask is then inverted. A logical AND is then performed with the inverted bit mask and the result to obtain a signal magnitude.

According to a preferred embodiment, the first group of signal data and the second group of signal data comprise n bits. Therefore, if the result is lower than the lower range signal magnitude 0, the signal magnitude comprises the lower range signal magnitude. Otherwise, the signal magnitude will contain the unaltered result.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

According to a preferred embodiment, a second group of n bit signal data is subtracted from a first group of n bit signal data to produce a result within the signal magnitude range of $0$-$(2^n-1)$. This method is achieved without the use of a branch instruction. Therefore, a substantial increase in computation speed is achieved when used in a system capable of parallel processing.

One such system is the UltraSPARC system. At any given time, the UltraSPARC is capable of executing as many as nine instructions simultaneously. Furthermore, dynamic branch prediction is used to speed the processing of branches. However, elimination of branch instructions is desirable since mispredictions are inevitable.

Figure 1:
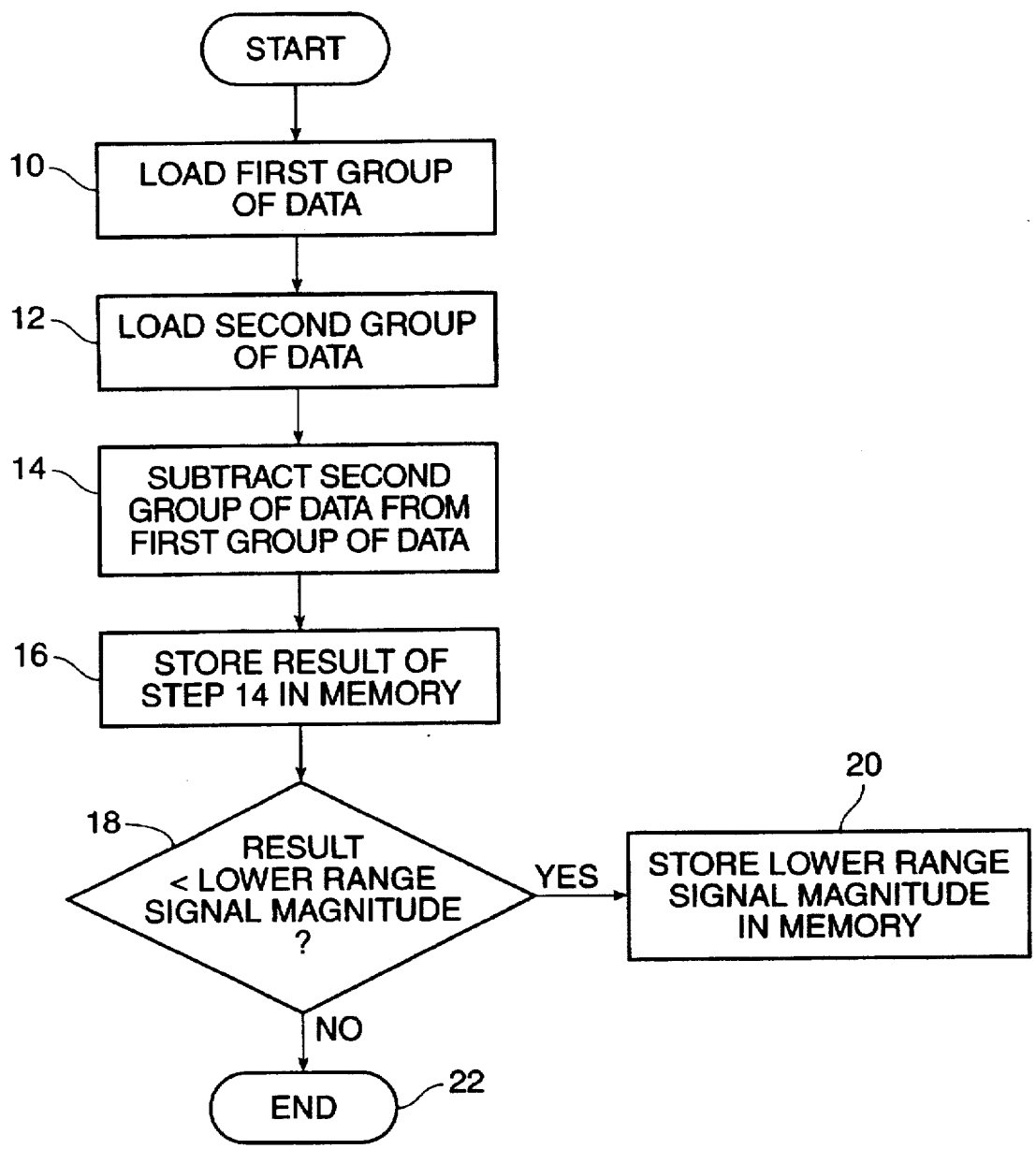
FIG. 1 is a flow diagram illustrating the prior art method for subtracting signal data in saturation mode.
Figure 2:
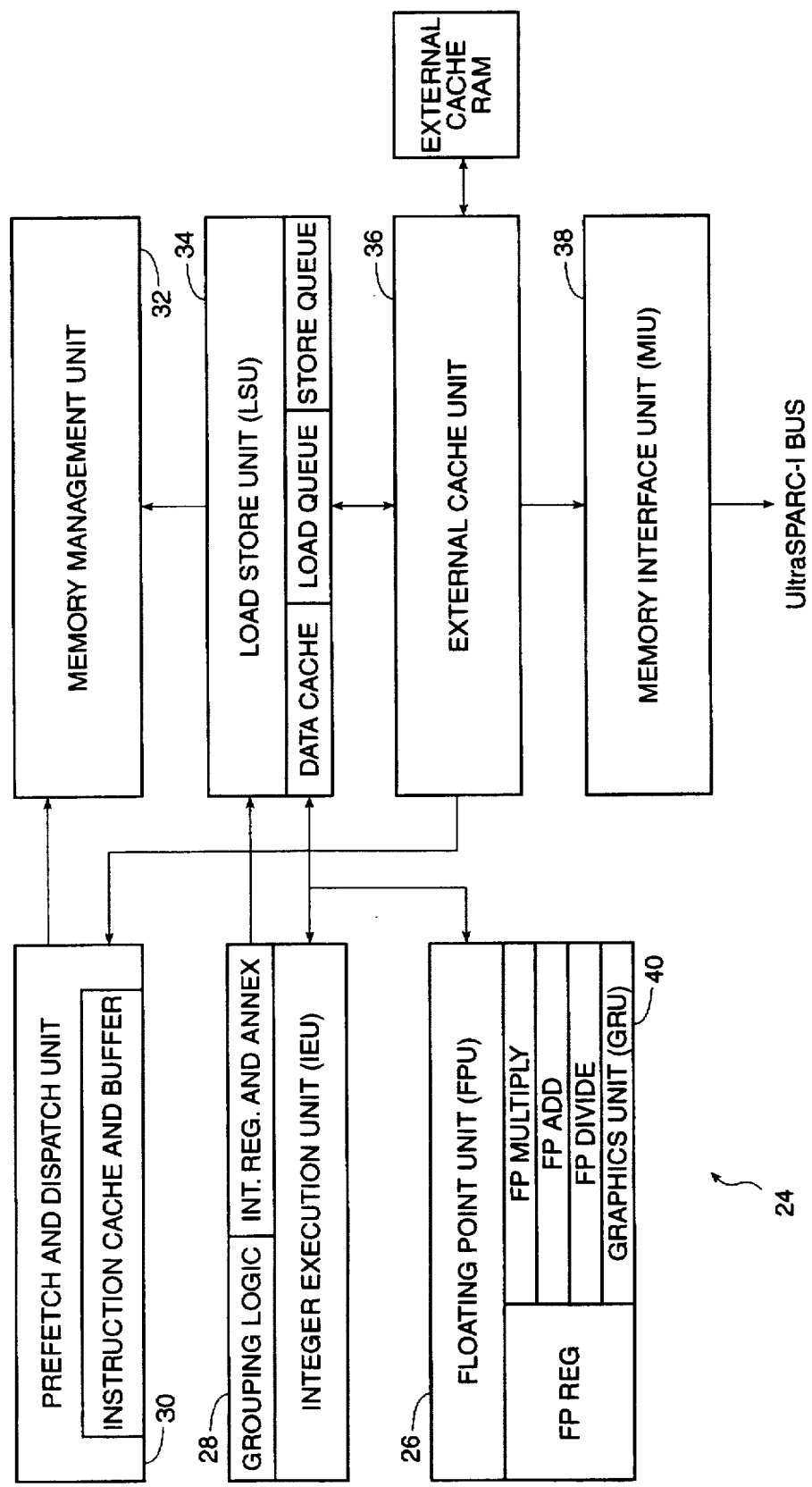
FIG. 2 is a block diagram of a representative Central Processing Unit utilizing the present invention.

Referring now to FIG. 2, a block diagram of a representative Central Processing Unit implementing the present invention is shown. A Central Processing Unit (CPU) 24 is presented which comprises a Floating Point Unit 26, an Integer Execution Unit 28, a Prefetch and Dispatch Unit 30, a Memory Management Unit 32, a Load Store Unit 34, an External Cache Unit 36, a Memory Interface Unit 38, and a Graphics Unit 40. The UltraSPARC graphics unit uses integer registers for addressing image data and floating point registers for manipulating image data.

Pixel information in UltraSPARC consists of four 8-bit or 16-bit integer values stored in UltraSPARC's 64-bit registers. These four values represent the color (RGB) and intensity information for a pixel of a color image. Intermediate results for advanced image manipulation are stored as 16- or 32-bit, fixed-data values. These fixed-data values provide enough precision for filtering and image computations on pixel values. Conversion from pixel data to the intermediate-fixed data may be achieved through the use of an expand operation, which converts the pixel information to a higher precision format for advanced graphics operations. For example, four 8-bit unsigned integers may each be converted to a 16-bit fixed value. The four 16-bit results may then be stored in a register. Similarly, the larger fixed data can be converted back to pixel data through the use of a pack instruction. For example, a 16- or 32- bit value can be clipped or truncated down to an 8-bit value. Both the packing and expand instructions are executed in one cycle.

Instructions that execute complex graphics operations can dramatically increase a processor's throughput. It would be extremely beneficial to reduce the number of operations required by these processes. Through introducing instructions which execute in one cycle, a processor can directly support 2-D, 3-D image and video processing, MPEG-2 image decompression and audio processing. Moreover, through the elimination of branches, the advantages of a system capable of parallel processing can be fully realized.

According to a presently preferred embodiment of the present invention, reduction of a signal magnitude to a lower range boundary in case of underflow is achieved without the use of a branch instruction. This method may be applied in the areas of video processing. For example, motion estimation requires computation of the sum of absolute differences between pixels in a current block and pixels in a reference block. Similarly, this method may be used in image processing functions. For example, the method may be used to calculate the absolute value of an image, or pixel of an image. Assignment of a boundary value upon occurrence of an underflow avoids obtaining a pixel having a brighter or dimmer color intensity than desired. Similarly, those of ordinary skill in the art will readily recognize that audio signal data can be processed in a similar manner. In addition, the presently preferred embodiment of the present invention may be implemented in linear algebra functions. For example, this method may be used to calculate the difference between the absolute values of two vectors. However, one of ordinary skill in the art will recognize that this method may be utilized in other applications.

Figure 3:
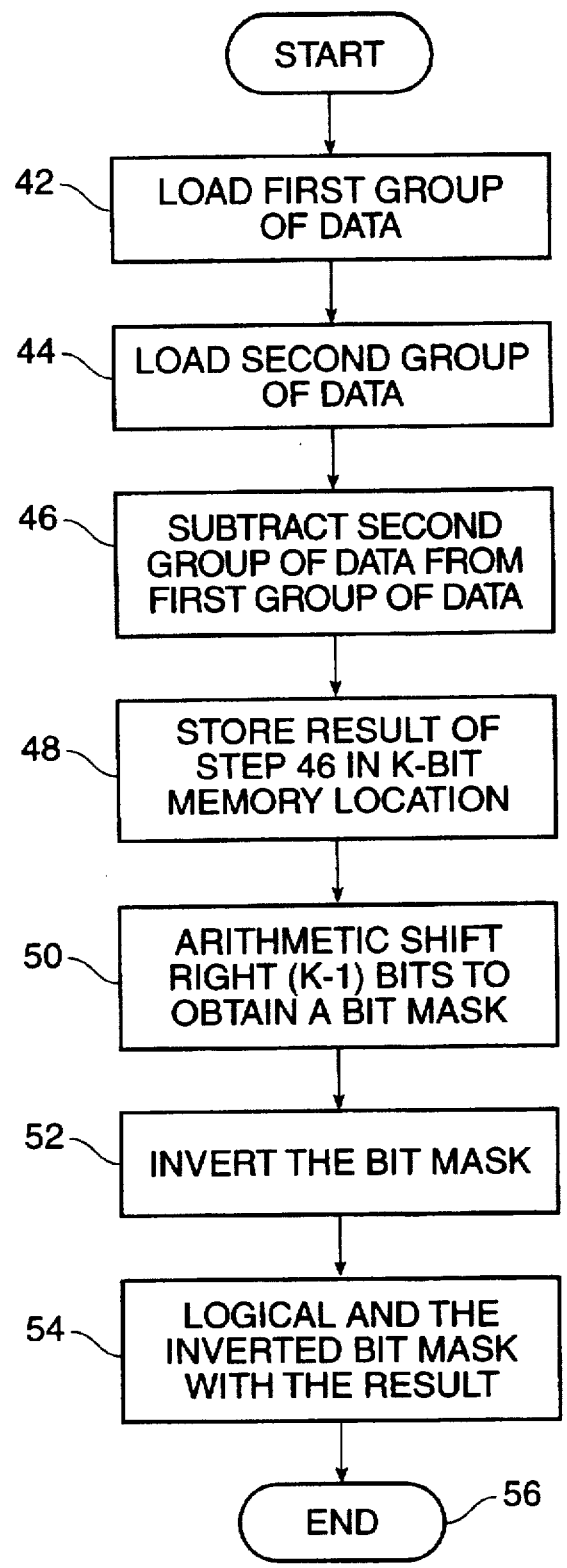
FIG. 3 is a flow diagram illustrating a method for handling underflow in a processor, according to a presently preferred embodiment of the present invention.

Referring now to FIG. 3, a flow diagram of a presently preferred embodiment of the present invention is shown. At step 42, a first group of n bit signal data is loaded into a first memory location. At step 44, a second group of n bit signal data is loaded into a second memory location. Alternatively, the first group of signal data and the second group of signal data may contain different numbers of bits. Next, at step 46, a bitwise operation is performed between the first group of signal data and the second group of signal data to produce a result. For example, the first group and the second group of data may manipulated through various means, such as subtraction or multiplication. At step 48, the result of step 46 is stored in a third k-bit memory location. Thus, the kth bit of the third memory location indicates whether a negative result, or underflow condition, has occurred. The underflow condition is indicated by a negative result, signaled by the existence of a "1" in the kth, or sign, bit. Next, at step 50, an arithmetic shift right (k-1) bits is performed upon the result obtained in step 46 to obtain a bit mask. This arithmetic shift to the right fills the k most significant bits of the bit mask with the value of the sign bit. Thus, the bit mask will contain a "1" if an underflow has taken place, and "0" if the underflow has not occurred. At step 52, the bit mask is inverted. At step 54, a logical AND is performed with the inverted bit mask and the result of step 46 to obtain a signal magnitude within the signal magnitude range of $0-(2^n-1)$. The method is completed at step 56. Therefore, if the result is less than a lower range signal magnitude 0, the signal magnitude comprises the lower range signal magnitude. Otherwise, the signal magnitude will contain the unaltered result.

Thus, in the event of an underflow, the lower n bits of the signal magnitude will contain a lower boundary value equal to 0. However, if an underflow has not occurred, the lower n bits of the signal magnitude comprises the unaltered result of step 46. Thus, in the event of an underflow, the lower n bits of the signal magnitude will contain a lower range signal magnitude equal to 0.

This method allows reduction of the difference between signal data to a lower range signal magnitude in case of underflow at a computation speed greater than may be achieved with a method requiring a branch instruction. Therefore, the present invention provides substantial benefits over the method typically used for boundary reduction in saturation mode. Moreover, this method is particularly enhanced when implemented on a computer capable of parallel processing.

According to one alternative embodiment, the method of the present invention may be included in a Field Programmable Gate Architecture (FPGA). Similarly, according to another alternative embodiment, an integrated circuit design program such as VHDL may be used to create an equivalent integrated circuit. Those of ordinary skill in the art will readily recognize that the construction of logic circuits to perform bitwise AND operations, shift operations, and subtraction operations are well known in the art.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A computer program for handling an underflow condition in a central processing unit, the program recorded in a computer-readable medium, the program performing the steps of:

selecting from a first signal a first plurality of bits of signal information to be processed;

selecting from a second signal a second plurality of bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

2. A computer program for handling an underflow condition in a central processing unit, the program recorded in a computer-readable medium, the program performing the steps of:

selecting from a first signal a first plurality of bits of signal information to be processed;

selecting from a second signal a second plurality of bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

3. The computer program according to claim 2, the bitwise operation being a subtraction operation.

4. The computer program according to claim 2 wherein n is 8 and k is 32.

5. In a computer having a memory, a method for handling an underflow condition in a central processing unit, the method comprising the steps of:

selecting from a first signal a first plurality of bits of signal information to be processed;

selecting from a second signal a second plurality of bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location so as to form a third word;

shifting the third word left (k−9) bits;

obtaining a bit mask by arithmetic shifting the result of the step of shifting right (k−1) bits; and performing a logical OR operation with the bit mask and the result.

6. In a computer having a memory, a method for handling an underflow condition in a central processing unit, the central processing unit reducing n bit signal data to an upper range boundary (2n−1) in an underflow condition, the method comprising the steps of:

selecting from a first signal a first plurality of n bits of signal information to be processed;

selecting from a second signal a second plurality of n bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

7. The method according to claim 6, the bitwise operation being a subtraction operation.

8. The method according to claim 6 wherein n is 8 and k is 32.

9. A computer program for handling an underflow condition in a video processor, the program recorded in a computer-readable medium, the program performing the steps of:

selecting from a first signal a first plurality of bits of signal information to be processed;

selecting from a second signal a second plurality of bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

10. A computer program for handling an underflow condition in a video processor, the program recorded in a computer-readable medium, the program performing the steps of:

selecting from a first signal a first plurality of n bits of signal information to be processed;

selecting from a second signal a second plurality of n bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

11. The computer program according to claim 10, the bitwise operation being a subtraction operation.

12. The computer program according to claim 11, wherein n is 8 and k is 32.

13. In a computer having a memory, a method for handling an underflow condition in a video processor, the method comprising the steps of:

selecting from a first signal a first plurality of bits of signal information to be processed;

selecting from a second signal a second plurality of bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

14. In a computer having a memory, a method for handling an underflow condition in a video processor, the video processor reducing n bit signal data to an upper range boundary (2n−1) in an underflow condition, the method comprising the steps of:

selecting from a first signal a first plurality of n bits of signal information to be processed;

selecting from a second signal a second plurality of n bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k memory location;

arithmetic shifting the shifted result right (k−1) bits to obtain a bit mask;

inverting the bit mask; and performing a logical AND operation with the inverted bit mask and the result.

15. The method according to claim 14, the bitwise operation being a subtraction operation.

16. The method according to claim 14 wherein n is 8 and k is 32.

17. A computer program for manipulating signals in a computer system such that an underflow condition does not occur, the program recorded in a computer-readable medium, the program performing the steps of:

selecting from a first signal a first plurality of bits of signal information to be processed;

selecting from a second signal a second plurality of bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

18. A computer program for manipulating signals in a computer system such that an underflow condition does not occur, the program recorded in a computer-readable medium, the program performing the steps of:

selecting from a first signal a first plurality of n bits of signal information to be processed;

selecting from a second signal a second plurality of n bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

19. The computer program according to claim 18, the bitwise operation being a subtraction operation.

20. The computer program according to claim 18, wherein n is 8 and k is 32.

21. In a computer having a memory, a method for manipulating signals such that an underflow condition does not occur, the method comprising the steps of:

selecting from a first signal a first plurality of bits of signal information to be processed;

selecting from a second signal a second plurality of bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

22. In a computer having a memory and a video processor, a method for manipulating signals in the video processor such that an underflow does not occur, the video processor reducing n bit signal data to an upper range boundary (2n−1) in an underflow condition, the method comprising the steps of:

selecting from a first signal a first plurality of n bits of signal information to be processed;

selecting from a second signal a second plurality of n bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a k bit memory location;

arithmetic shifting the shifted result right (k−1) bits to obtain a bit mask;

inverting the bit mask; and performing a logical AND operation with the inverted bit mask and the result.

23. The method according to claim 22, the bitwise operation being a subtraction operation.

24. The method according to claim 22 wherein n is 8 and k is 32.

25. A computer program for manipulating video signals representing pixel values such that the pixel values remain within the range of 0 to 255, the program performing the steps of:

selecting from a first signal a first plurality of bits of signal information to be processed;

selecting from a second signal a second plurality of bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a 32 bit memory location;

arithmetic shifting the shifted result right 31 bits to obtain a bit mask;

inverting the bit mask; and performing a logical AND operation with the inverted bit mask and the result.

26. A computer program manipulating video signals representing pixel values such that the pixel values remain within the range of 0 to 255, the program performing the steps of:

selecting from a first signal a first plurality of n bits of signal information to be processed;

selecting from a second signal a second plurality of n bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a 32 bit memory location;

arithmetic shifting the shifted result right 31 bits to obtain a bit mask;

inverting the bit mask; and performing a logical AND operation with the inverted bit mask and the result.

27. The computer program according to claim 26, the bitwise operation being a subtraction operation.

28. In a computer having a memory, a method for manipulating video signals representing pixel values such that the pixel values remain within the range of 0 to 255, the method comprising the steps of:

selecting from a first signal a first plurality of bits of signal information to be processed;

selecting from a second signal a second plurality of bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a 32 bit memory location;

arithmetic shifting the shifted result right 31 bits to obtain a bit mask;

inverting the bit mask; and performing a logical AND operation with the inverted bit mask and the result.

29. In a computer having a memory and a video processor, a method for manipulating video signals representing pixel values such that the pixel values remain within the range of 0 to 255, the method comprising the steps of:

selecting from a first signal a first plurality of n bits of signal information to be processed;

selecting from a second signal a second plurality of n bits of signal information to be processed;

packing the first plurality of bits into contiguous memory so as to form a first word;

packing the second plurality of bits into contiguous memory so as to form a second word;

causing a bitwise operation to be performed between the first word and the second word to produce a result;

storing the result in a 32 bit memory location;

arithmetic shifting the shifted result right 31 bits to obtain a bit mask;

inverting the bit mask; and performing a logical AND operation with the inverted bit mask and the result.

30. The method according to claim 29, the bitwise operation being a subtraction operation.

31. A computer program for pixel manipulation in an UltraSPARC system, wherein the UltraSPARC system contains four j-bit integer values stored in registers for each pixel in an image, the first three integer values representing the red, green, and blue components of the pixel and the fourth integer value representing the intensity of the pixel, the program performing the steps of:

selecting one of the j-bit integer values from a register and performing an expand operation on it, storing the result in a 2j-bit memory location;

causing a bitwise operation to be performed between said result and another 2j-bit integer, producing a 2j-bit intermediate value;

obtaining a bit mask by arithmetic shifting said shifted intermediate value right (2j–1) bits;

inverting said bit mask;

performing a logical AND operation with said inverted bit mask and said intermediate result, producing a corrected value;

performing a pack operation on said corrected value, producing a final j-bit result; and storing said final j-bit result back in said register.

32. The computer program of claim 31, wherein j is 8.

33. The computer program of claim 31, wherein j is 16.

34. A method for pixel manipulation in an UltraSPARC system, wherein the UltraSPARC system contains four j-bit integer values stored in registers for each pixel in an image, the first three integer values representing the red, green, and blue components of the pixel and the fourth integer value representing the intensity of the pixel, the method comprising the steps of:

selecting one of the j-bit integer values from a register and performing an expand operation on it, storing the result in a 2j-bit memory location;

causing a bitwise operation to be performed between said result and another 2j-bit integer, producing a 2j-bit intermediate value;

obtaining a bit mask by arithmetic shifting said shifted intermediate value right (2j–1) bits;

inverting said bit mask;

performing a logical AND operation with said inverted bit mask and said intermediate result, producing a corrected value;

performing a pack operation on said corrected value, producing a final j-bit result; and storing said final j-bit result back in said register.

35. The method of claim 34, wherein j is 8.

36. The method of claim 34, wherein j is 16.

37. A computer program for manipulating j-bit signal data in a computer system with memory, the program performing the steps of:

- performing an expand operation on the j-bit signal data, storing the result in a 2j-bit memory location;
- causing a bitwise operation to be performed between said result and another 2j-bit integer, producing a 2j-bit intermediate value;
- obtaining a bit mask by arithmetic shifting said shifted intermediate value right (2j–1) bits;
- inverting said bit mask;
- performing a logical AND operation with said inverted bit mask and said intermediate result, producing a corrected value; and
- performing a pack operation on said corrected value, producing a final j-bit result.

38. The computer program of claim 37, wherein j is 8.

39. The computer program of claim 37, wherein j is 16.

40. A method for manipulating j-bit signal data in a computer system with memory, the method comprising the steps of:

- performing an expand operation on the j-bit signal data, storing the result in a 2j-bit memory location;
- causing a bitwise operation to be performed between said result and another 2j-bit integer, producing a 2j-bit intermediate value;
- obtaining a bit mask by arithmetic shifting said shifted intermediate value right (2j–1) bits;
- performing a logical AND operation with said inverted bit mask and said intermediate result, producing a corrected value; and
- performing a pack operation on said corrected value, producing a final j-bit result.

41. The method of claim 40, wherein j is 8.

42. The method of claim 40, wherein j is 16.

* * * * *

UNITED STATES PATENT AND TRADEMARK OFFICE
CERTIFICATE OF CORRECTION

PATENT NO. : 5,896,307
DATED : April 20, 1999
INVENTOR(S) : Vladimir Volkonsky

It is certified that error appears in the above-identified patent and that said Letters Patent is hereby corrected as shown below:

On column 7, line 24, replace "k memory" with --k bit memory--.

Signed and Sealed this

Sixteenth Day of November, 1999

Attest:

Q. TODD DICKINSON

*Attesting Officer*   *Acting Commissioner of Patents and Trademarks*